Oct. 20, 1959 G. W. RANDOLPH ET AL 2,909,066

INDEXING SYSTEM

Filed Dec. 28, 1953

2 Sheets-Sheet 1

EARL L. WAGNER
GLENN W. RANDOLPH
*INVENTORS*

*BY*

Killman and Kerst
ATTORNEYS

Oct. 20, 1959 G. W. RANDOLPH ET AL 2,909,066

INDEXING SYSTEM

Filed Dec. 28, 1953

2 Sheets-Sheet 2

EARL L. WAGNER
GLENN W. RANDOLPH
*INVENTORS*

BY

Killman and Kerst
ATTORNEYS

United States Patent Office 2,909,066

Patented Oct. 20, 1959

2,909,066

INDEXING SYSTEM

Glenn W. Randolph and Earl L. Wagner, Baltimore, Md., assignors to Bendix Aviation Corporation, Towson, Md., a corporation of Delaware Application December 28, 1953, Serial No. 400,539

4 Claims. (Cl. 74—10)

This invention relates to tuning mechanisms for radio apparatus and in particular, to push button tuners for radio receivers.

It is often desirable to have push button tuning arrangements in radio receivers. They have been found to be especially useful in automobile receivers where the operator of the automobile wishes to select another station when driving conditions require a constant scrutiny of the road.

Many types of push button tuning arrangements have been proposed. They utilize various expedients for varying different tuning elements and devices for providing continuous tuning in addition to push button tuning.

The present invention provides a means for affording continuous tuning in a push button tuning mechanism of the general mechanical type disclosed in J. H. Teaf et al., 2,230,852. Teaf et al. show a mechanism wherein the variable components are physically arranged and interconnected such that the rotation of a shaft provides motion for effecting tuning adjustments to the variable components, Parallel to this shaft and disposed on opposite sides thereof, are two rods. The individual push button assemblies of the mechanism contain finger-like projections on one set of their extremities that come into contact with the rods such that forces are applied to the rods to cause the shaft to rotate to the positions necessary for the varying components to produce the desired results. When the push buttons are not activated, forces are not exerted against the rods, so that it is possible, by an auxiliary means, to vary the position of the shaft so as to choose any position throughout its field of rotation. The auxiliary means generally utilized is a knob, on the front panel of the tuner, which is connected by appropriate shafting and gearing to the aforementioned shaft of the mechanism of Teaf et al. The gearing, because of the mechanical advantage and adjusting sensitivity desired, must have a step-down ratio. If the knob and its associated shafting and step-down gearing remain connected to the shaft of the mechanism, a load is placed on the push buttons when they are activated such that a relatively large pressure is required on a push button to effect a change in the rotational position of the shaft. Because of the large amount of pressure required, the additional disadvantage of roughness in operation is present. Therefore, it is highly desirable, when using the push buttons, to relieve the push buttons of the load brought about by the continuous tuning arrangement.

It is an object of this present invention to provide a means for continuous tuning in a push button tuner.

Another object of this invention is to provide a means for providing continuous tuning in a push button tuner wherein the back loading of the continuous tuning mechanism is reduced when the push buttons are activated.

A further object of the present invention is to provide continuous tuning in a push button tuner which will permit the push button tuning operation to be performed with smoothness and ease.

These and other objects are realized in an arrangement whereby a system employing a differential gearing mechanism and a brake is employed in conjunction with a push button tuner of the general type as disclosed by Teaf et al.

Referring to the drawings.

Figure 2:
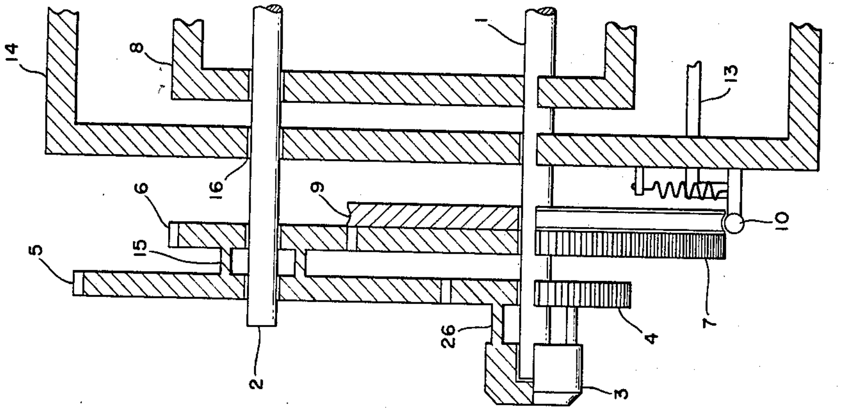
Fig. 2 is a sectional view of Fig. 1 taken along the line 2—2.
Figure 1:
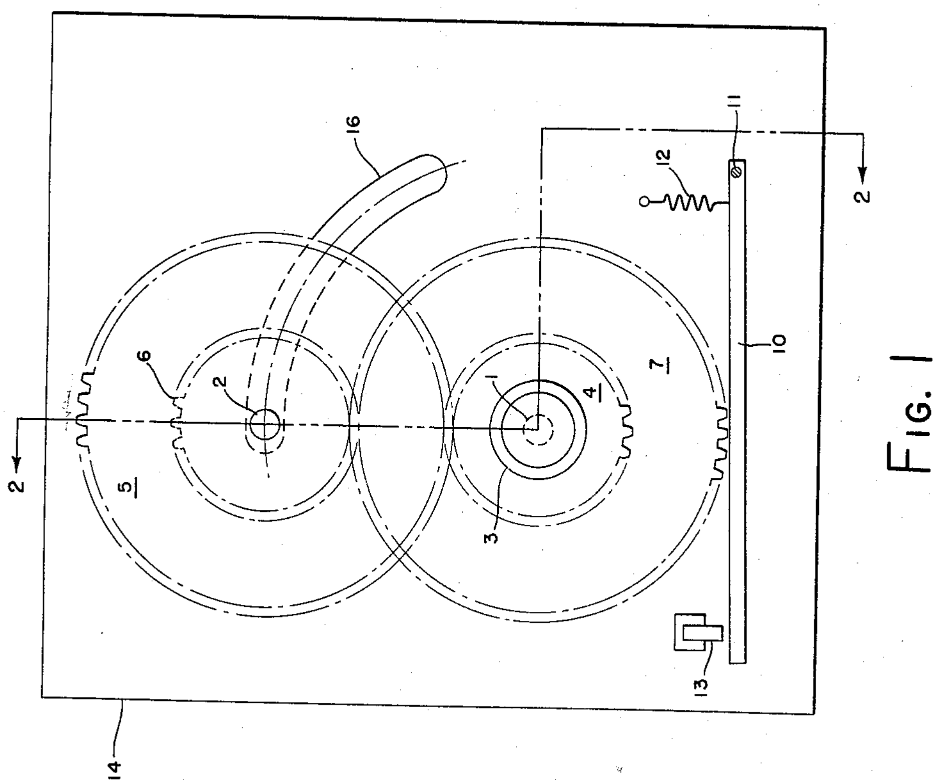
Fig. 1 is an elevational view illustrating a differential gearing arrangement and a brake operating in conjunction with a push button tuner.

Referring in particular to Figs. 1 and 2, a shaft 1 is an extension of the shaft 18 of the mechanism of Teaf et al. discussed supra. The mechanism of Teaf et al. is enclosed in a housing 14 the vertical portion of which may be one of the end plates 1 or 2 of Teaf et al. A shaft 2 may be an extension of one of the aforementioned rods 21 of the mechanism of Teaf et al. or a shaft parallel to but displaced from the saft 1 and connected to a structure 8 mounted thereon, the vertical portion of which may be parallel to the yoke members 19 of Teaf et al. and movable unitarily therewith.

A knob 3 and a gear 4 are mounted on the shaft 1 and are free to rotate thereon. A means 26 is provided such that the knob 3 and the gear 4 rotate in unison. Meshing with the gear 4 is a gear 5 which is mounted on the shaft 2 such that relative motion may exist therebetween. Also mounted on the shaft 2, and connected to the gear 5 by a means 15 such that it will rotate in synchronism therewith, is a gear 6. Mounted on the shaft 1 such that it is free to rotate, and meshing with the gear 6, is a gear 7.

Attached to the gear 7 is a pulley 9. A brake arm 10, pivoted about a point 11, is brought to bear against the pulley 9 by the force exerted by a spring 12. To relieve the force of the brake arm 10 on the pulley 9, a releasing arm 13 is provided.

Figure 3:
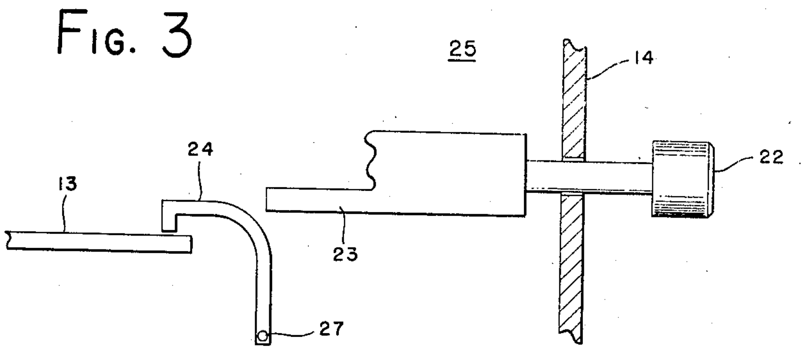
Fig. 3 is an elevational view of a push button assembly.

Referring to Fig. 3, a push button assembly 25 is shown in conjunction with the housing 14 and the releasing arm 13. When a push button 22 is activated, the releasing arm 13 is forced downward by a slide 23, forcing a means 24 to revolve about a pivot point 27. All of the push button assemblies 25 are similar in construction such that the activation of any one of the push buttons 22 will release the braking action.

Referring in particular to Fig. 1, a slot 16 is provided which permits the shaft 2 to revolve around the shaft 1 in an arc which is at all times equidistant from the shaft 1. The positioning of the structure 8, which effects the station selection, is determined by the position of the shaft 2 in the slot 16.

The operation of the arrangement for continuous tuning by the use of the knob 3 is as follows: The brake arm 10 is bearing against the pulley 9 such that the gear 7 is not free to rotate. The turning of the knob 3 causes the gear 4 to rotate. As the gear 4 meshes with the gear 5, the gear 5 must also rotate. This motion is transferred to the gear 6 as they are mechanically joined by the means 15. Since the gear 7 is locked, the gear 6, in order to rotate, must revolve around the gear 7. The revolving action of the gear 6 around the gear 7 causes the structure 8 to revolve around the shaft 1, which is the desired result.

For push button operation, the brake arm 10 is released by the releasing arm 13, thereby permitting the gear 7 to rotate freely. When the structure 8 is moved by the push button action, the position of the shaft 2 in the slot 16 must change. As the knob 3 is free to rotate with respect to the housing 14, the entire gear assembly will revolve around the shaft 1 through the arc determined by the motion of the shaft 2 in the slot 16. As there is no relative motion between the gears, the gears reflect no loading effect to the push button assemblies and consequently, the system operates with the same loading as is present in the tuning mechanism as described in Teaf et al.

If the knob 3 is not connected directly to the shaft 1, but instead is connected through other means thereto, then the loading applied to the gear 4 by the other means may be such that it in effect applies a braking action to the gear 4. Under these circumstances, the gear 5 must revolve around the gear 4. Because of the gear ratios existing in the gear train, the frictional load, caused by the gears and bearings, reflected back to the structure 8 is small and therefore no appreciable increase in loading is experienced at the push buttons.

Although only one differential system has been illustrated and discussed in describing the invention, it is obvious that there are other types of differential systems that will produce the desired results.

What is claimed is:

1. In an indexing system, including push button means for indexing a revolvable structure to predetermined settings, a means for producing a continuous indexing output from said system, comprising: a planetary means; said planetary means consisting of two shafts and four gears; the axis of the first of the said shafts being coincident with the axis about which the said structure revolves; the second of the said shafts being parallel to the said first shaft and being connected to the said structure and extending therefrom in the same sense as the said first shaft; the first of the said gears being mounted on the said first shaft such that it is free to rotate thereon; the second of the said gears being mounted on the said second shaft such that it is free to rotate thereon and meshes with the said first gear; the third of the said gears being mounted on the said second shaft, such that it is free to rotate thereon and is joined to the said second gear such that it will rotate in unison therewith; the fourth of the said gears being mounted on the said first shaft such that it is free to rotate thereon and meshes with the said third gear; a braking means; said braking means operating on the said fourth gear; means releasing said braking means coincident with the indexing action of the said push button means; and controlling means for operating the said first gear.

2. In a radio receiver system including push button means for tuning by revolving a structure to predetermined settings, means for producing a continuous tuning in the said system, comprising: a planetary means; said planetary means consisting of two shafts and four gears; the axis of the first of the said shafts being coincident with the axis about which the said structure revolves; the second of the said shafts being parallel to the said first shaft and being connected to the said structure and extending therefrom in the same sense as the said first shaft; the first of the said gears being mounted on the said first shaft such that it is free to rotate thereon; the second of the said gears being mounted on the said second shaft such that it is free to rotate thereon and meshes with the said first gear; the third of the said gears being mounted on the said second shaft, such that it is free to rotate thereon and is joined to the said second gear such that it will rotate in unison therewith; the fourth of the said gears being mounted on the said first shaft such that it is free to rotate thereon and meshes with the said third gear; a braking means; said braking means operating on the said fourth gear; means releasing said braking means when the said push button means is activated; and controlling means for operating the said first gear.

3. In an indexing system including push button means for indexing a revolvable structure to predetermined settings, a means for producing a continuous indexing output from said system, comprising: a planetary means; said planetary means consisting of two shafts and four gears; the axis of the first of the said shafts being coincident with the axis about which the said structure revolves; the second of the said shafts being parallel to the said first shaft and being connected to the said structure and extending therefrom in the same sense as the said first shaft; the first of the said gears being a pinion type gear mounted on the said first shaft such that it is free to rotate thereon; the second of the said gears being mounted on the said second shaft such that it is free to rotate thereon and meshes with the said first gear; the third of the said gears being a pinion type gear mounted on the said second shaft, such that it is free to rotate thereon, and being joined to the said second gear such that it will rotate in unison therewith; the fourth of the said gears being mounted on the said first shaft such that it is free to rotate thereon and meshes with the said third gear; a braking means; said braking means operating on the said fourth gear; means releasing said braking means when the said push button means is activated; and controlling means for operating the said first gear.

4. In a radio receiver system including push button means for tuning by revolving a structure to predetermined settings, a means for producing a continuous tuning in the said system, comprising: a planetary means; said planetary means consisting of two shafts and four gears; the axis of the first of the said shafts being coincident with the axis about which the said structure revolves; the second of the said shafts being parallel to the said first shaft and being connected to the said structure and extending therefrom in the same sense as the said first shaft; the first of the said gears being a pinion type gear mounted on the said first shaft such that it is free to rotate thereon; the second of the said gears being mounted on the said second shaft such that it is free to rotate thereon and meshes with the said first gear; the third of the said gears being a pinion type gear mounted on the said second shaft, such that it is free to rotate thereon, and being joined to the said second gear such that it will rotate in unison therewith; the fourth of the said gears being mounted on the said first shaft such that it is free to rotate thereon and meshes with the said third gear; a braking means; said braking means operating on the said fourth gear; means releasing said braking means when the said push button means is activated; and controlling means for operating the said first gear.

References Cited in the file of this patent

UNITED STATES PATENTS

| | | |
|---|---|---|
| 361,222 | Jones et al. | Apr. 12, 1887 |
| 1,300,474 | O'Conner | Apr. 15, 1919 |
| 1,793,051 | Butler | Feb. 17, 1931 |
| 1,818,310 | Dow | Aug. 11, 1931 |
| 2,612,782 | Wandrey | Oct. 7, 1952 |
| 2,741,351 | Fletcher et al. | Apr. 10, 1956 |